C. E. AKELEY.
FILM FEED DEVICE FOR MOTION PICTURE CAMERAS.
APPLICATION FILED APR. 10, 1915.
1,177,163.
Patented Mar. 28, 1916.
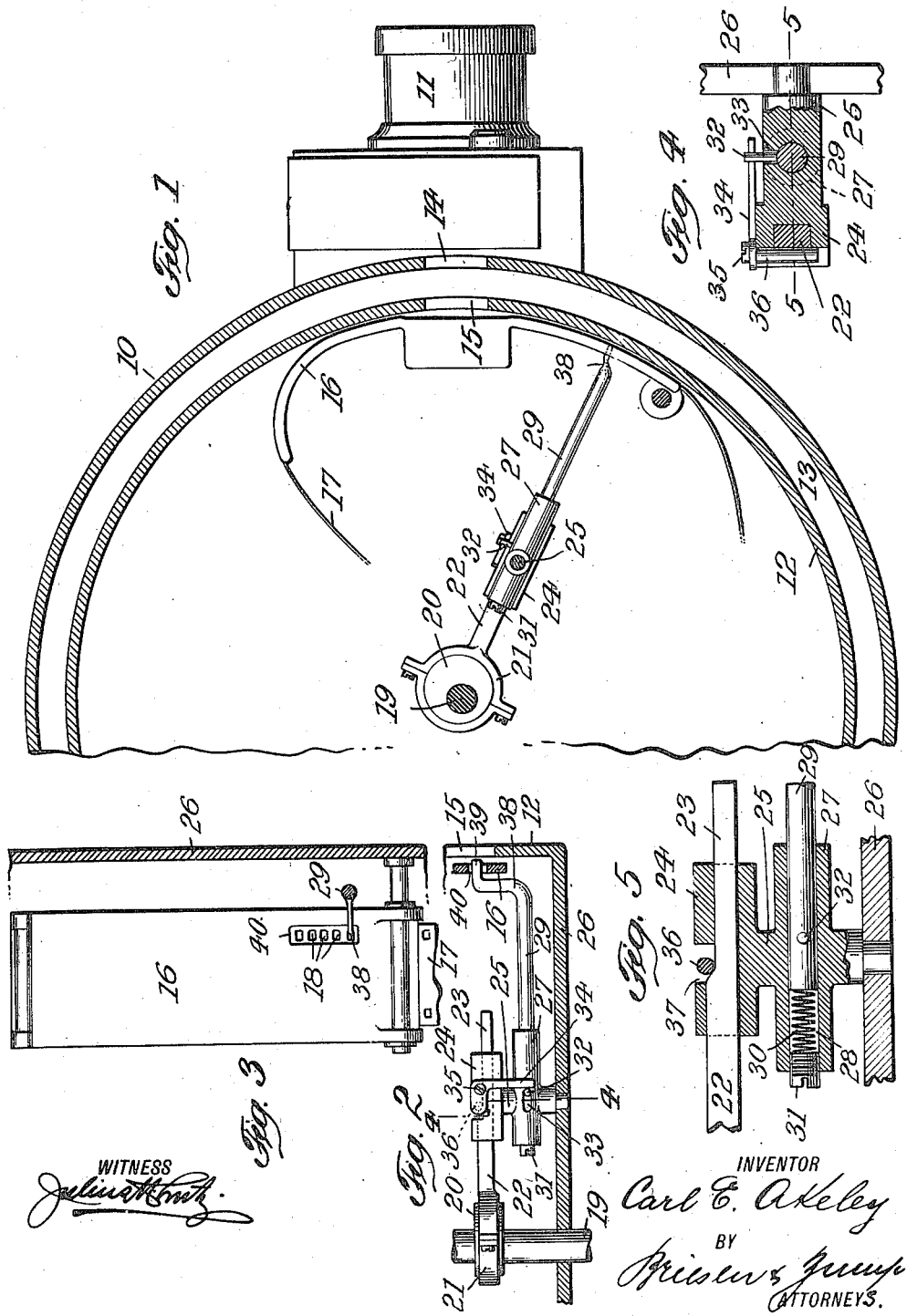

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

FILM-FEED DEVICE FOR MOTION-PICTURE CAMERAS.

1,177,163.  Specification of Letters Patent.  Patented Mar. 28, 1916.

Application filed April 10, 1915. Serial No. 20,411.

*To all whom it may concern:*

Be it known that I, CARL E. AKELEY, a citizen of the United States, and a resident of New York city, county and State of New York, have invented new and useful Improvements in Film-Feed Devices for Motion-Picture Cameras, of which the following is a specification.

This invention relates to a novel device for intermittently advancing the film of a motion picture camera so as to subject consecutive portions of the film to temporary exposure.

In the accompanying drawing, Figure 1 is a sectional bottom view of part of a motion picture camera provided with my improved film feed device; Fig. 2 a sectional side view of the film feed device; Fig. 3 an inner sectional view of the hinged film guide and coöperating parts; Fig. 4 an enlarged cross section on line 4—4, Fig. 2, and Fig. 5 a longitudinal section on line 5—5, Fig. 4.

My improved film feed device is shown to be applied to a cylindrical motion picture camera 10 provided with a lens tube 11 although it is obvious that said device may be used in conjunction with cameras of any design and construction. Within camera 10 is contained a likewise cylindrical box 12 spaced from the camera casing to form an intervening annular chamber 13 adapted for the accommodation of a rotary shutter (not shown), a camera of this construction being for instance shown and described in a copending application for United States Letters Patent filed by me August 3rd, 1914, under Serial Number 854,777. Casing 10 and box 12 are respectively provided with perforations 14, 15 alined with the lens tube 11, while back of perforation 15 there is arranged a curved guide 16 for the film 17 which is provided with the usual marginal row of perforations 18.

Within camera 10 is axially mounted a suitably driven power shaft 19 carrying a relatively fixed eccentric 20. The latter is embraced by a strap 21 provided with a rod or slide 22 of preferably rectangular cross section and having an end portion 23 of reduced height as clearly illustrated in Figs. 2 and 5. Rod 22 is slidably mounted in a corresponding guide way of a rectangular head 24 of a stem 25 stepped into a corresponding socket of the bottom plate 26 of box 12. Between head 24 and plate 26, stem 25 is provided with a transverse bearing 27 in the axial bore 28 of which a feed bar 29 is slidably mounted. This bar is normally forced outward by means of a spring 30 located within bore 28 and pressed against the inner end of bar 29 by a screw 31. The play of bar 29 is limited by a pin or abutment 32 extending outwardly therefrom through a corresponding slot 33 of bearing 27. The protruding end of pin 32 is engaged by one arm of a bell-crank lever 34 pivoted at 35 to head 24. The other arm of this lever is provided with a stud 36 engaging the top of slide 22 through a recess 37 of head 24. Bar 29 is shown to be provided with an outer bent end 38 terminating in a finger 39 that is adapted to enter the perforations 18 of film 17 through a corresponding opening 40 of guide 16.

It will be seen that upon a rotation of eccentric 20, slide 22 will receive a reciprocating motion relatively to head 24 while at the same time said head together with the stem 25 and bearing 27 is oscillated. Owing to the reciprocation of slide 22, the stud 36 of bell-crank lever 34 will alternately be engaged by the full portion of slide 22 and by its reduced portion 23. In this way the lever 34 will be once oscillated during each revolution of eccentric 20. This oscillation of lever 34 is transmitted through pin 32 to feed bar 29 so that its finger 39 will be alternately inserted into and withdrawn from the perforations 18 of film 17. While finger 39 is thus axially reciprocated, it is at the same time laterally oscillated owing to the above mentioned oscillation of bearing 27, the oscillation of finger 39 being so timed that while said finger is inserted into one of the perforations 18, it is laterally swung in such a direction as to advance the film as desired. After being withdrawn from said perforation, the finger is swung back to its original position while the film remains stationary for exposing purposes as will be readily understood. The stud 36 is maintained in permanent contact with the upper stepped face or cam surface of slide 22 by spring 30 which tends to permanently force bar 29 outward thereby pressing the pin 32 against the lower arm of the lever 34 and thus drawing the stud 36 carried by the upper arm of said lever against the slide 22. It will thus be seen that the peculiar movement of the feed finger 39 is produced by but a single eccentric on the driving shaft 19 so that in this way a simple and reliable construction is obtained.

Although I have described my invention with particular reference to the embodiment thereof shown in the drawing, I desire it to be understood that various changes of construction may be made and that such modified constructions will still fall within the scope of the appended claims.

I claim:

1. A film feed device for motion picture cameras, comprising a driving shaft, an eccentric carried thereby, an oscillative member actuated by said eccentric, a finger slidably supported by said member and adapted to engage a film-perforation, and means also actuated by said eccentric for reciprocating said finger relatively to the oscillative member.

2. A film feed device for motion picture cameras, comprising a driving shaft, an eccentric carried thereby, a slide actuated by said eccentric, an oscillative member engaged by said slide, a finger slidably supported by said member and adapted to engage a film-perforation, said finger participating in the oscillative movement of the member, and means actuated by the slide for reciprocating the finger, the reciprocative play of the finger being independent of the longitudinal stroke of the slide.

3. A film feed device for motion picture cameras, comprising a finger adapted to engage a film-perforation, a driving shaft, an eccentric carried thereby, a slide actuated by said eccentric and having a cam surface, a pivoted head engaged by said slide, a bearing connected to said head, a bar slidably engaging said bearing and carrying the finger, and means cooperating with the cam surface of the slide for axially moving said bar.

4. A film feed device for motion picture cameras, comprising a finger adapted to engage a film-perforation, a driving shaft, an eccentric carried thereby, a slide actuated by said eccentric and having a cam surface, a pivoted head engaged by said slide, a bearing connected to said head, a bar slidably engaging said bearing and carrying the finger, and a lever pivoted to the head, said lever engaging the cam surface of the slide and actuating the bar.

5. A film feed device for motion picture cameras, comprising a finger adapted to engage a film-perforation, a driving shaft, an eccentric carried thereby, a slide actuated by said eccentric and having a cam surface, a pivoted head engaged by said slide, a bearing connected to said head, a bar slidably engaging said bearing and carrying the finger, an abutment on said bar, and a lever pivoted to the head and engaging the cam surface of the slide and said abutment.

6. A film feed device for motion picture cameras, comprising a finger adapted to engage a film-perforation, a driving shaft, an eccentric carried thereby, a slide actuated by said eccentric and having a cam surface, a pivoted head engaged by said slide, a bearing connected to said head, a spring-influenced bar engaging said bearing and carrying the finger, a pin projecting outwardly from said bar, a bell-crank lever fulcrumed to the head and engaging said pin, and a stud on said lever that engages the cam surface of the slide.

CARL E. AKELEY.